US00RE44889E

(19) United States
(12) Reissued Patent
Miller et al.

(10) Patent Number: US RE44,889 E
(45) Date of Reissued Patent: May 13, 2014

(54) BISTABLE LIQUID CRYSTAL DEVICES

(75) Inventors: Richard Jonathan Miller, Malvern (GB); John Clifford Jones, Malvern (GB)

(73) Assignee: F. Poszat Hu, LLC, Wilmington, DE (US)

(21) Appl. No.: 12/039,697

(22) Filed: Feb. 28, 2008 (Under 37 CFR 1.47)

Related U.S. Patent Documents

Reissue of:
(64) Patent No.: 7,006,165
Issued: Feb. 28, 2006
Appl. No.: 10/332,902
PCT Filed: Jul. 11, 2001
PCT No.: PCT/GB01/03112
§ 371 (c)(1),
(2), (4) Date: Feb. 11, 2003
PCT Pub. No.: WO02/06888
PCT Pub. Date: Jan. 24, 2002

(30) Foreign Application Priority Data

Jul. 15, 2000 (GB) ..... 0017312

(51) Int. Cl.
*G02F 1/133* (2006.01)
*G02F 1/139* (2006.01)
*G02F 1/1337* (2006.01)

(52) U.S. Cl.
USPC ..... 349/24; 349/22; 349/123; 349/191; 349/129

(58) Field of Classification Search
USPC ..... 349/22, 24, 123, 124, 128, 129, 130, 349/160, 163, 165, 177, 182, 187, 191; 252/299.01, 299.1; 430/20, 321; 345/50, 87
See application file for complete search history.

(56) References Cited

U.S. PATENT DOCUMENTS 4,813,767 A * 3/1989 Clark et al. ..... 349/133
5,032,009 A 7/1991 Gibbons et al.

(Continued)

FOREIGN PATENT DOCUMENTS

GB 2318422 A 4/1998
WO 95/22077 8/1995

(Continued)

OTHER PUBLICATIONS

Kim, G.H. et al., "Optical Switching of Nematic Liquid Crystal by Means of Photoresponsive Polyimides as an Alignment Layer", Applied Physics Letters, American Institute of Physics, New York, vol. 75, No. 21, Nov. 22, 1999, pp. 3458-3460, (HP000875709).

(Continued)

*Primary Examiner* — Edward Glick
*Assistant Examiner* — Tai Duong
(74) *Attorney, Agent, or Firm* — Stolowitz Ford Cowger LLP

(57) ABSTRACT

In a liquid crystal device a substrate (1) favors at least two stable or metastable differently directed liquid crystal alignments, and switching means for causing the liquid crystal material to switch between the alignments includes means arranged for optically irradiating said device. The latter may provide linearly polarized light (3) for inducing a torque on the liquid crystal to determine the alignment direction, and may optionally cooperate with a second energy supplying means such as an electric field (V) for assisting and switching. Alternatively, the alignment of the liquid crystal may be switched by a second energy supplying means such as an electric field, the light serving to produce heat to aid the switching. Either or both energy sources may be applied locally for switching of selected areas or pixels. Energy levels at the bistable substrate may be adjusted by the use of an oligomeric additive (slippery surface). As shown, the alignment at the surface of an opposed substrate (2) optionally follows the alignment at substrate (1).

63 Claims, 4 Drawing Sheets

(56) References Cited

U.S. PATENT DOCUMENTS

| | | | | |
|---|---|---|---|---|
| 5,506,708 | A * | 4/1996 | Harrison et al. | 349/182 |
| 5,548,427 | A * | 8/1996 | May | 349/117 |
| 6,373,549 | B1 * | 4/2002 | Tombling et al. | 349/201 |
| 6,525,879 | B1 * | 2/2003 | Kawano et al. | 359/559 |
| 7,006,165 | B1 | 2/2006 | Miller et al. | |

FOREIGN PATENT DOCUMENTS

| | | | |
|---|---|---|---|
| WO | 96/31876 | A1 | 10/1996 |
| WO | 97/14990 | A1 | 4/1997 |
| WO | WO 97/14990 | * | 4/1997 |
| WO | 99/00993 | | 1/1999 |
| WO | 99/18474 | | 4/1999 |
| WO | 99/19767 | | 4/1999 |
| WO | 99/34251 | | 7/1999 |
| WO | 02/06888 | A1 | 1/2002 |
| WO | 0206888 | | 1/2002 |

OTHER PUBLICATIONS

Wang, Y. et al., Alignment of a Nematic Liquid Crystal Induced by Anisotropic Photo-Oxidation of Photosensitive Polyimide Films:, Journal of Applied Physics, Oct. 15, 1998, vol. 84, No. 8, pp. 4573-4578, (XP02180280).

Juodkazis, S. et al., "Size Dependence of Rotation Frequency on Individual Laser Trapped Liquid Crystal Droplets", Japanese Journal of Applied Physics, Tokyo, Japan, vol. 38, No. 5A, May 1, 1999, pp. L518-L520, (XP000890579).

Kurihara, S. et al., "Optical Shutter Driven Photochemically Anisotropic Polymer Network Containing Liquid Crystalline and Azobenzene Molecules", Applied Physics Letters, American Institute of Physics, New York, vol. 73, No. 2, Jul. 13, 1998, pp. 160-162 (XP000771190).

Feringa, B.L. et al., "Chiroptical Switching Between Liquid Crystalline Phases", Journal of the American Chemical Society, Washington, D.C., vol. 117, No. 39, 1995, pp. 9929-9930, (XP000619719).

Docchio, F. et al., "Light-Induced Transmission Changes in Liquid Crystal Displays for Adaptive Pattern Projection", IEEE Transactions on Instrumentation and Measurement, New York, vol. 41, No. 5, Oct. 1, 1992, pp. 629-632, (XP000323835).

European Patent Office, International Search Report for PCT/GB01/03112, dated Oct. 16, 2001, 2 pages.

Stolowitz Ford Cowger LLP, "Listing of Related Cases", Feb. 26, 2012, 1 page.

* cited by examiner

BISTABLE LIQUID CRYSTAL DEVICES

Matter enclosed in heavy brackets [ ] appears in the original patent but forms no part of this reissue specification; matter printed in italics indicates the additions made by reissue.

The present application is a U.S. National Phase (371 application) of PCT/GB01/03112, filed 11 Jul. 2001.

BACKGROUND OF THE INVENTION

1. Field of the Invention

The present invention relates to liquid crystal devices, and has particular but not exclusive relevance to spatial light modulators.

2. Discussion of Prior Art

It is known to incorporate anisotropic dichroic materials, or dyes, in a liquid crystal host material, and/or to provide liquid crystal material in which at least one liquid crystal component has a significant dichroism. In one type of device, known as a "guest-host" device, guest dye molecules align co-operatively with the molecules of a host liquid crystal material. Alteration of the liquid crystal alignment, for example by application of an electric field, causes the dye molecules to re-orientate, thereby altering the optical properties of the device, and in particular the absorption or colour.

However, it is also possible to manipulate the molecules, for example by exposing the dye molecules to linearly polarised light within the absorption band of the dye, so as to affect the liquid crystal alignment. The polarised light tends to produce an effective re-orientation of the dye molecules, and this in turn produces a small torque on the liquid crystal host material, pushing its director away from the polarisation direction of the incident light. Where the liquid crystal molecules absorb the polarised light directly, a similar effect can occur, but without the intermediation of the dye.

It is also known that the alignment of a liquid crystal phase adjacent the surface of a substrate is dependent inter alia on the properties of the substrate surface. Although a substrate surface is often treated, for example by rubbing a polymer film or by vapour deposition, so as to induce a single energetically preferred type of alignment at the surface, it is known that it is possible to treat a substrate surface so that there is more than one energetically favourable alignment thereat. The favoured alignments will be separated by intervening alignments which are less favoured energetically, i.e. there is an energy barrier between the favoured alignments. The favoured alignments may or may not be energetically equal, or equally favourable relative to the intervening alignments, and there is a degree of control of the height of the energy barrier as will be exemplified later. In certain cases, particularly where a first alignment is more energetically stable than a second alignment, the energy barrier may be sufficiently low relative to the second alignment that relaxation to the first alignment may occur in response to ambient or supplied thermal energy, for example, so that the second alignment is considered to be metastable.

In most cases at least, the surface will receive treatments corresponding to each stable alignment. The treatments may use the same type of treatment for each alignment, for example two differently aligned gratings or oblique vapour deposition from two different angles, or different types of treatment may be used for different ones of the alignments, for example a surface profile such as a grating for a planar alignment and a coating of material to induce homeotropic Thus, one way of providing at least two favoured alignments on a substrate surface is to provide a suitable surface relief pattern, such as one defined by two sets of parallel lines (gratings) extending in different directions over a common area. Depending on depth, the resulting pattern may vary front an array of isolated pillars on a flat surface to a smoothly varying "eggbox" pattern. A typical spacing for each set of parallel lines is around one micron, and for two favoured alignments the two sets of parallel lines could intersect at 90° or a lower angle. The two azimuthal directions of the preferred liquid crystal phase alignments thereat would be expected to differ by a corresponding angle. This type of arrangement is known as "azimuthally bistable" and further details thereof will be found in our UK Patent No. 0744041.

In an alternative arrangement, the substrate comprises a surface relief pattern such as a one dimensional sinusoidal grating, which is designed to give stability to a planar alignment with a predetermined direction. Typically the surface corrugations of the grating are 1 micron or less in height and are formed using photolithography or embossing. Provided over the grating is a layer for inducing homeotropic alignment of the adjacent liquid crystal material.

The homeotropic alignment layer and the surface relief pattern compete in defining the bulk alignment of the adjacent liquid crystal. The alignment tends to be homeotropic or planar depending on whether the depth of the grating is respectively far less or far greater than its pitch, but by tailoring the depth to pitch ratio to lie between these two extremes a bistable region is entered where either alignment has a degree of stability (corresponding to respective energy minima as the alignment direction is altered, as indicated schematically in FIG. 1 as a plot of energy against liquid crystal tilt angle (shown by way of example only with homeotropic alignment energy minima lying either side of a planar alignment energy minimum). The two alignment directions may have the same azimuthal direction (i.e. lie in the same azimuthal plane), or they may not. Generally, the energy minima for the two types of alignment may or may not be equal, and in the latter case, either alignment may have the lower energy minimum corresponding to the more preferred alignment—this will, in part, be determined by the depth to pitch ratio of the surface relief pattern.

While the exact profile of the surface relief pattern appears to be relatively unimportant in achieving bistability in tilt angle, it may contribute to the energy barrier between the two preferred alignments and/or to the associated energy minimum for the planar alignment. It should be noted that FIG. 1 is an example of the more general case where two stable orientations, not necessarily planar and homeotropic, have different values of "tilt" or "zenithal angle", and that the invention is not limited to the situation shown in FIG. 1, but extends to this more general case.

In this arrangement, the "planar" alignment may sometimes involve a relatively high tilt angle, and is sometime referred to as the defect state, because it is also characterised by a pair of line defects in the liquid crystal or nematic director. Arrangements having stable planar and homeotropic states in which the liquid crystal director lies in the same azimuthal plane are known as "zenithally bistable arrangements", and further details thereof will be found for example in our UK Patent No. 2318422, and our published patent application PCT/GB98/03787 (WO 9934251).

It should be understood that other bistable surfaces will possess at least two preferred alignment directions which differ in both zenithal and azimuthal angle. For example, silicon oxide could be deposited obliquely from two different directions which also differ in both zenithal and azimuthal angle.

Although surface profiles in the form of gratings, formed for example by photolithographic techniques, have been specifically mentioned above, any other method of providing a surface profile could be used, such as by oblique evaporation.

Furthermore, it should be noted that although the two bistable arrangements specifically described above both involve a surface profile, the latter is not a necessary requirement for providing a plurality of stable alignments at a substrate. Any arrangement where more than one alignment is energetically favourable, whether imposed by use the same technique adapted for each preferred direction as in the example of crossed gratings above, or by the use of different techniques for each preferred direction as in the case of the grating and homeotropic surface treatment exemplified above, may be used.

In addition, it is not an absolute requirement that each part of the substrate surface is adapted to favour both alignments. For example, each two commingled sets of suitably dimensioned and/or shaped areas of a substrate may be treated to produce the different alignments, whereupon it may be arranged that either of the alignments, once adopted and favoured by one set of areas, will prevail over the alignment favoured by the other set of areas. Thus two interleaved sets of stripes may be treated differently to produce a favoured planar alignment for one set and either a favoured differently directed second planar alignment or a homeotropic alignment for the other set, using any of the techniques mentioned above, such as surface treatment, coating, and/or profiling.

By careful choice of the liquid crystal material, including the provision of appropriate additive(s) to the liquid crystal material, and as indicated above by suitably selecting and/or treating the substrate surface in known ways, it is possible to control the energy barrier(s) between the two preferred alignment states. Also, in an assembled device comprising a layer of liquid crystal material between the one bistable (or polystable) substrate and a further substrate, the alignment imposed at the surface of the other substrate may modify the energies of the stable states at the one substrate.

SUMMARY OF THE INVENTION

A relatively recent development in modifying the interaction between a liquid crystal phase and a surface goes under the name of "slippery surfaces", as described for example in International Patent Application PCT/GB98/03011 (WO 9918474) (Hewlett-Packard). An additive in the liquid crystal material, commonly an oligomer, provides large molecules which tend to concentrate near the substrate surface. The resulting reverse directed concentration gradient of the liquid crystal phase away from the substrate(s) is believed to reduce the interaction between the substrate and/or any alignment layer thereon and the liquid crystal material, and accordingly reduces the energy required to alter the alignment of the adjacent liquid crystal material from that induced by the substrate and/or any alignment layer thereon. In fact, at certain concentrations, such an additive will permit a planar aligned surface to have complete degeneracy with regard to its alignment direction. The presence of such additives can facilitate performance of the present invention by reducing the energy barrier between two or more different favoured alignments induced by a substrate surface, e.g. as described above.

The invention provides a liquid crystal device comprising liquid crystal material in contact with the surface of a substrate, said surface favouring at least first and second stable or metastable liquid crystal alignments thereat with respective first and second different directions, and switching means for causing the liquid crystal material to switch between said alignments, wherein said switching means includes irradiating means for illuminating said device. The invention extends to a display comprising such a device, and to a display or optical system comprising a plurality of such devices, for example tiled in a common plane.

The invention also provides a method of controlling the alignment of liquid crystal material in contact with a substrate surface which favours at least first and second stable or metastable liquid crystal alignments thereat with respective first and second different directions, including the step of optically irradiating said device.

The light from the irradiating means provides the or a first energy input to the device, and may act directly or indirectly on the liquid crystal material. Thus in some embodiments of the invention an unpolarised light beam alone might provide sufficient thermal energy to convert from a metastable alignment as described above to a more stable alignment; or the thermal energy may be sufficient to destroy the existing alignment, or the liquid crystal phase, so that a second alignment may be preferentially adopted under a directional influence of some other energy input (such as an electric or magnetic field) as described in greater detail below.

In other embodiments of the invention, this light may be linearly polarised to impose an effective torque on the liquid crystal molecules either directly or indirectly, or to render one of the first and second alignments more energetically favourable relative to the other of the first and second alignments (this may be regarded as effective rotation), as is known in the art.

For example, a material which comprises a double bond link such as an azo compound, a stilbene or a Schiff base will normally have a low energy trans isomer and a higher energy cis isomer. The double bond will absorb light at wavelengths in or close to the visible range, but preferentially for light polarised in one direction relative to the double bond, and the material is positively dichroic. In the excited state the molecule can undergo a series of changes resulting in conversion to the cis isomer. Consequential relaxation to the energetically favourable trans isomer can lead to a molecular alignment similar to the initial alignment, or to an alignment which is effectively rotated relative to the initial alignment. Under isotropic conditions, there is nothing to distinguish the initial and rotated alignments, but with polarised illumination one of the alignments of the trans isomer preferentially absorbs light, eventually leading to the majority of molecules ending up with a trans orientation that minimises the absorption of the incident polarised light.

A typical sequence of events is illustrated schematically in FIG. 2, in which (a) shows an azo molecule in its original alignment in the energetically favoured trans state, and (b) shows the higher energy cis state arising from absorption of polarised light hyl. Via any of a number of mechanisms including thermal and radiative mechanisms ($hv_2$) the molecule (b) may revert to the original state (a) or may proceed to a trans state in which the direction of the long molecular axis has effectively rotated (although as shown this is not a true rotation in the plane of the paper, the reader will appreciate that rotation of the molecule about the long axis is energetically relatively easy, and whether or not this occurs is in any case irrelevant in relation to the liquid crystal alignment to be induced).

For example, where the spectral composition of the irradiating light includes an absorption band of the liquid crystal material, it may act directly on the liquid crystal material. The latter therefore need contain no dichroic additive for enabling the change of liquid crystal alignment Nevertheless, a dichroic additive having an absorption spectrum lying outside the spectrum of the irradiating light may be provided for other purposes, for example for exhibiting a desired optical change as in guest-host variable absorption/colour devices.

Alternatively, the liquid crystal material may be in the form of a dichroic additive in a liquid crystal host, wherein the said spectral composition of the irradiating light includes an absorption band of the dichroic additive. In this case the dichroic additive responds directly to the irradiation, and in turn exerts an effective torque on the liquid crystal molecules.

Although reference has been made to positively dichroic material, which tends to cause the liquid crystal material to align transversely to the optical polarisation direction, it is within the ambit of the invention to use negatively dichroic materials, which tend to rotate the liquid crystal material so that it lies parallel to the polarisation direction.

The direct or indirect torque induced by the polarised light may of itself be sufficient to overcome the energy barrier between the favoured alignment. Where this is not the case, it is possible either to modify the interaction between the liquid crystal material and the substrate to reduce the energy barrier so that a light energy input is sufficient, or to assist the realignment by inputting a second form of energy.

With respect to the first option, the preceding description has already briefly discussed two ways of reducing the energy barrier between alignments, viz. by modifying the surface geometry, and by incorporating an additive to provide a "slippery surface", and either or both of these may be utilised in the performance of the invention.

With respect to the second option, realignment may be assisted by effectively putting energy into the liquid crystal material over and above that supplied by the light from the irradiating means. In the case of a liquid crystal host-guest additive material, the co-operative alignment means that energy may be supplied either to the host or to the guest material regardless of which of these is being energised by the polarised light.

The second energy may be sufficient per se to alter the alignment of the liquid crystal material, although the final alignment may still depend on the optical input from the irradiating means (see case A two paragraphs below), or realignment may require the optical input from the irradiating means working in combination with the second energy input (see case B two paragraphs below).

Many ways are known for energising a liquid crystal material to alter its alignment, including the application of an electric or magnetic field, passage of an electric current (ion transport), and acoustic irradiation.

Of these perhaps the application of an electric field is probably the most easily accomplished, and is often the most effective. For example, where the liquid crystal alignment is to be altered between first and second homogeneous (parallel) states, and has positive dielectric anisotropy, application of an electric field across the thickness of a layer in the first state to induce a homeotropic (perpendicular) alignment will then enable the liquid crystal material preferentially to assume the second state on cessation of the field under the influence of light of an appropriately directed linear polarisation (case A). Indeed, even if the magnitude of the field (or the magnitude of the effect of any other energy supplying means) is insufficient of itself to produce an alternative alignment, the energy of the original preferred alignment may be raised sufficiently to assist in realignment of the liquid crystal material to the second alignment when polarised light is applied (case B).

When the layer is sandwiched between two substrates, each substrate may carry a continuous electrode for applying an electric field across the thickness of the layer. Either or both continuous electrodes may be replaced by an interdigitated electrode for the same purpose, particularly if both parts of the interdigitated electrode are energised in the same way.

An interdigitated electrode may also be used to apply a field in the plane of the layer. For example, an interdigitated electrode on the substrate having two favoured alignment directions may be employed to alter a planar alignment of a positive dielectric anisotropy liquid crystal material so that it lies at or close to a maximum energy state between the favoured alignments. Removal of the field in the presence of linearly polarised light of an appropriate polarisation direction and intensity will induce the liquid crystal to relax to the favoured alignment as determined by the polarisation direction.

In many cases, the polarisation direction of the irradiating light may alone determine the resulting liquid crystal alignment, particularly where no other energy input is provided. This also applies where a second energy input is provided but has no directional property capable of affecting the resulting alignment.

However, in certain other cases, the second energy input is directional and can affect the resulting alignment, for example an electric field. Where this is not desired, the second energy input should normally cease before the irradiating light is turned off.

Alternatively, maintaining the second energy input after cessation of the irradiating light may lead to determination of the resulting alignment by the second energy input, if this is desired.

Furthermore, where the irradiating light is unpolarised, it cannot per se determine the resulting alignment. In such a case, it will be the second energy input which will determine the resulting alignment, with the irradiating light being relegated to performing the lesser but necessary function of assisting in the realignment, for example by heating the liquid crystal material either directly or indirectly, as by optical absorption by the liquid crystal material, or a component thereof, or by another component of a liquid crystal cell.

In many cases the same type of method, including providing an input from the irradiating means, will be used for switching between the preferred alignments in both directions. However, in other cases different methods will be used for the different switching directions, provided that at least one switching direction involves irradiation from the irradiating means.

This may be particularly so where the energy minima for the preferred alignments are not equal, and including the case where one alignment is metastable, so that the energy barrier depends on switching direction. For example switching in one direction, from the less stable or metastable alignment, may require only unpolarised or polarised light from the irradiating means. Switching in the reverse direction may require a second energy input, such as an electric field, used alone or in conjunction with appropriate light from the irradiating means. Alternatively, switching in the one direction could be effected by a second energy input, with reversal requiring a combination of the second energy input and suitable light from the irradiating means.

The light from the irradiating means may be applied locally so as to produce different alignments across the area of the device. Where a second energy input is also required, such as an electric field, this may also be applied locally so that only a restricted area of the device may be written at any time. In this case, one of the irradiation and second energy input may be applied universally and the other may be applied locally, so that the local input determines which areas are switched. Alternatively both inputs may be applied locally, possibly with different distributions so that only areas where both inputs occur are switched, i.e. an AND logical function. Other logical arrangements may occur to the skilled person.

The ability to alter selected areas of the device means that it can be used for a number of purposes, including displays and optical data processing. For example, our copending International Patent Application No. PCT/GB98/01866 (WO 9900993) describes an autostereoscopic display in which an assembly of displays is tiled, and International Patent Application No. PCT/GB98/03097 (WO 9919767) shows an assembly of individual displays for holographic purposes.

A device is described by Kim et al in "Optical Switching of Nematic Liquid Crystal by Means of Photosensitive Polyimides as an Alignment Layer" Applied Physics Letters, 29 Nov. 1999, pp 3458-60. In this device the threshold voltage for switching between two liquid crystal alignments is influenced by irradiation of the polyimide layer, and it is suggested that the latter undergoes "photophysical changes". It is possible to switch the liquid crystal by varying the radiation in the presence of a constant voltage. However, the alignment layer itself is not described as favouring more than one alignment direction. Moreover as described this device requires irradiation of the alignment layer to change its properties, whereas in embodiments of the present invention the spectral composition of the light is selected with respect to the liquid crystal material so as to exert a torque thereon or to alter its temperature for switching purposes.

Similarly, Wang et al in "Alignment of a Nematic Liquid Crystal Induced by Anisotropic Photo-Oxidation of Photosensitive Polyimide Films" in Applied Physics Letters, 15 Oct. 1998, pages 4573-8, describe a process in which the alignment properties of a polyimide film can be altered by irradiation with linearly polarised laser light. Again, however, there is no suggestion that the layer is ever capable of supporting either of two alignments at the same time.

BRIEF DESCRIPTION OF THE DRAWINGS

Other features and advantages of the invention will become apparent upon consideration of the appended claims, to which the reader is referred, and upon a reading of the following description of exemplary embodiments of devices according to the invention, made with reference to the accompanying drawings in which:

DETAILED DISCUSSION OF EMBODIMENTS

Embodiment 1

A layer of liquid crystal material containing a dichroic additive is sandwiched between first and second substrates. The first substrate has a surface profile for azimuthal bistable surface alignment (two stable, or favoured, planar alignments having different azimuthal directions), and the second surface comprises a non-rubbed polymer surface of the type which, if rubbed, would promote planar alignment. The liquid crystal material contains a slippery surface additive of a sufficient concentration to allow degeneracy of (planar) alignment at the second substrate surface but insufficient to destroy the bistability of alignment at the first substrate surface. This construction means that either of the two bistable alignments at the first substrate surface generates a respective uniform planar texture across the liquid crystal layer with a different azimuthal direction.

Application of linearly polarised light of a sufficient intensity and an appropriate polarisation direction to the liquid crystal material suffices to convert one uniform planar texture to the other or vice versa. The intensity of the polarised light will be determined, inter alia, by the energy barrier between the bistable alignments as determined by the surface geometry of the first substrate, and the concentration of slippery surface additive, amongst other factors.

Embodiment 2

This is similar to embodiment 1, but (a) the energy barrier between the bistable alignments is of a magnitude such that the polarised light alone is insufficient to cause conversion between the two planar textures (or if a source of polarised light of sufficient light intensity is available to cause conversion it would be detrimental to the cell), and (b) each substrate is provided with a continuous electrode for applying a field across the liquid crystal layer thickness. When a field is applied of sufficient intensity to induce a homeotropic alignment in the layer and is then removed in the presence of linearly polarised light, the alignment of the liquid crystal material at the first substrate relaxes to the preferred alignment determined by the polarisation direction.

Figure 3:
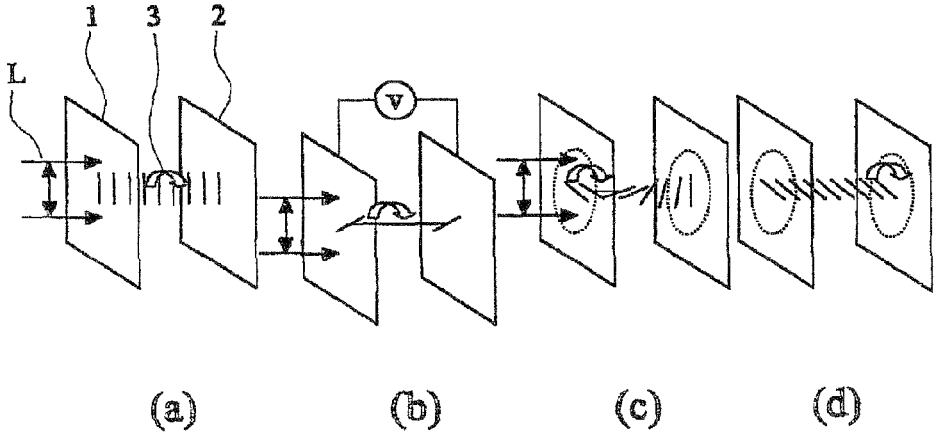
FIGS. 3(a) to 3(d) schematically illustrate operation of Embodiment 2 below, which is an example using an azimuthally bistable surface.

FIGS. 3(a) to 3(d) schematically illustrate operation of this embodiment, for a cell comprising a liquid crystal layer 3 between an azimuthally bistable first electrode providing substrate 1 and a (non-aligning) second electrode providing substrate 2. FIGS. 3(a) to 3 (c) cover a period when linearly polarised illumination L is being applied (effectively to induce a torque on the liquid crystal molecules). Within that period, FIG. 3(b), an electric field is applied across the cell by applying a potential difference V between the electrodes of the substrates, to produce a homeotropic orientation. On removal of the field the alignment at the substrate 1 relaxes to that determined by the polarisation direction of the illumination L, FIG. 3(c). The liquid crystal orientation at the bistable substrate is transferred through the bulk liquid crystal layer to the other substrate, as permitted by the slippery surface effect thereat, FIG. 3(d).

This embodiment has the advantage that the device can only be updated when an electric field is applied, and is otherwise stable. It is possible to arrange that the electric field per se is sufficient to produce the homeotropic orientation for subsequent relaxation to a state determined by application of polarised light. By selectively illuminating different areas with different optical polarisations, it is possible to write an image.

However, it is also possible to arrange that only those portions of the liquid crystal which are addressed both optically and electrically are brought to the homeotropic state, in which case selective spatial optical addressing of the cell enables only selected areas of the cell to be written and latched, giving rise to the possibility of writing a complex image with a single electrode pair, e.g. for high density images and image or data storage.

In an experiment, an azimuthally bistable grating surface was prepared by coating a clean glass substrate with etched indium tin oxide. A photoresist Microposit S1805 as supplied by Shipley Europe Limited was spin coated onto this coating giving a layer nominally 0.5 microns thick. A 1 micron pitch binary grating mask was then placed in contact with the photoresist and exposed using a broadband UV light source (365 nm, 404 nm and 435 nm at about 150 mJ/cm$^2$). The grating was then rotated by 90° and the exposure repeated. Development of the exposed photoresist according to specification was followed by a soft bake in UV light for 15 minutes (254 nm light at about 9 mW/cm$^2$) and a hard bake at 180° C. for 2 hours. A cell was constructed using the above substrate and a similarly processed substrate in which the photoresist, however, was not exposed to create a grating. The gap between the substrates was nominally 5 microns and was filled using a standard mixture E63 from Merck, which has a nematic phase at room temperature. To this mixture was added 2 weight percent of a dichroic dye D2, also from Merck, and 2 weight percent of an oligomer 3M Flourad FC430 as supplied from 3M Belgium N.V. The dye has peak absorption at 487 nm, dropping to zero at close to 600 nm.

A 20 mW argon ion laser (448 nm wavelength) displaying a 1 mm$^2$ Gaussian beam profile at the cell was used to address the cell via a rotatable half-wave plate to control its polarisation direction. The optical response of the cell was monitored using a linearly polarised beam from a 5 mW HeNe laser (663 nm wavelength) plus linear polariser focussed to a spot size at the cell smaller than that of the argon ion laser. The transmitted intensity of the 633 nm light was detected by a photodiode fitted with a linear analyser and a notch filter to exclude virtually all visible wavelengths other than the HeNe light. The device was addressed with bipolar electrical pulses to switch the cell into a homeotropic state. Bistable liquid crystal cell orientations at 90° to each other were set vertical and horizontal while the polariser and analyser were set at plus and minus 45° respectively. Since the stable states have optically equivalent transmissions between crossed polarisers a quarter wave plate was incorporated after the cell to distinguish the two states.

Figure 4:
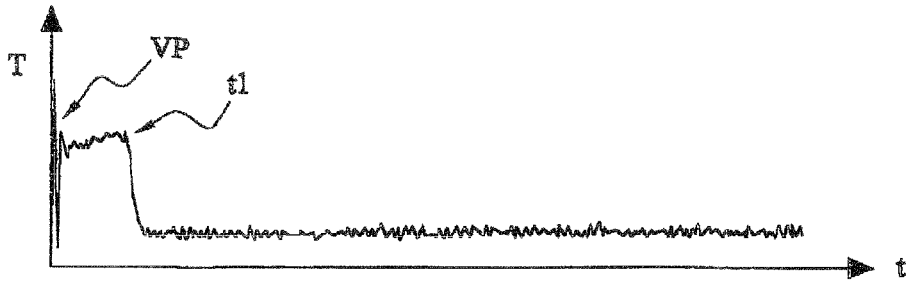
FIGS. 4 and 5 are voltage-time graphs illustrating the response of the cell of Embodiment 2.
Figure 5:
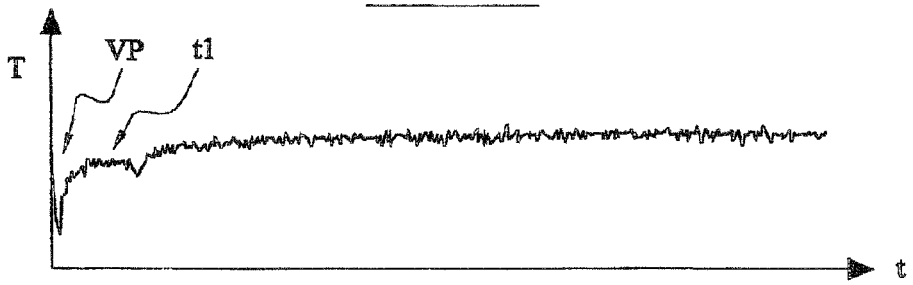

Switching of the device is illustrated in FIGS. 4 and 5, showing transmission T as a function of time t over a period of around 50 seconds. During application of 488 nm illumination of either vertical (FIG. 4) or horizontal (FIG. 5) linear polarisation, an 80 mV 10 msec bipolar electric pulse VP was also applied, which triggered data collection by the oscilloscope. Subsequent removal of the illumination around 5 seconds later at a point T1 allowed the liquid crystal to relax (over possibly hundreds of milliseconds) to a final orientation, and as can be seen by a comparison of the final parts of FIGS. 4 and 5, this can be selected by selection of the polarisation direction of the 488 nm illumination.

Figure 6:
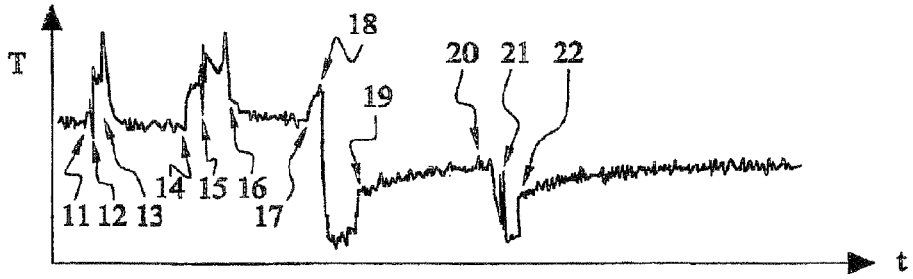
FIGS. 6 and 7 are voltage-time graphs further illustrating the response of the cell of Embodiment 2, and the need for the electric field to be applied in this embodiment.
Figure 7:
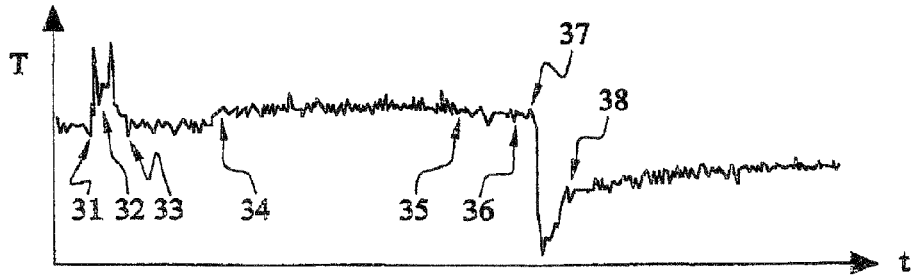

A further insight into the behaviour of the cell may be gained from a consideration of FIGS. 6 and 7, showing transmission T as a function of time t over a period of around 200 seconds. In FIG. 6 the cell is taken through the following series of steps:

11. Horizontal polarised light ON.
12. Voltage pulse applied.
13. Horizontal polarised light OFF.
14. Horizontal polarised light ON.
15. Voltage pulse applied.
16. Horizontal polarised light OFF.
17. Vertical polarised light ON.
18. Voltage pulse applied.
19. Vertical polarised light OFF.
20. Vertical polarised light ON.
21. Voltage pulse applied.
22. Vertical polarised light OFF.

This shows that there is no net effect of repeating the addressing cycle, viz. steps 4 to 6 and 10 to 12. However, when an addressing cycle specifying a new orientation is carried out, as in steps 17 to 19, the liquid crystal alignment changes to a second stable state (step 18).

FIG. 7 illustrates the need for the voltage pulse and shows the following sequence of events:

31. Horizontal polarised light ON.
32. Voltage pulse applied.
33. Horizontal polarised light OFF.
34. Vertical polarised light ON.
35. Vertical polarised light OFF.
36. Vertical polarised light ON.
37. Voltage pulse applied.
38. Vertical polarised light OFF.

Steps 31 to 33 with horizontally polarised illumination are not intended to affect the state of the cell but to ensure that it is in the state induced by horizontally polarised illumination. Steps 34 and 35 with vertically polarised illumination in the absence of an applied voltage likewise do not alter the state of the cell. However, the insertion of a voltage pulse 37 during illumination with vertically polarised light, steps 36 to 38, triggers a change of state and on removal of the illumination at step 38 the liquid crystal alignment is altered.

Embodiment 3

A layer of liquid crystal material containing a dichroic additive is sandwiched between first and second substrates, the first substrate having a surface profile providing an azimuthal bistable surface alignment, and the second surface comprising a polymer surface which has been rubbed to promote planar alignment thereat parallel to one of the preferred alignments at the first substrate. The planar alignment at the second substrate persists, so that in one state of the device there is a uniform planar texture across the liquid crystal layer, and in the other state the liquid crystal is twisted. The liquid crystal material also contains a chiral additive to render the energies of the uniform and twisted states generally (and preferably substantially) equal, so as to facilitate switching therebetween on application of light of the appropriate linear polarisation direction and intensity.

Optionally, the liquid crystal material may include a slippery surface additive as in embodiments 1 and 2, but not at such a high concentration that the planar alignment at the second surface is rendered ineffective, and/or the device may include electrodes for applying a field across the layer thickness as in embodiment 2.

Embodiment 4

A layer of liquid crystal material containing a dichroic additive is sandwiched between first and second substrates, the first substrate having a surface profile providing an azimuthal bistable surface alignment, and the second surface comprising a polymer surface which has been rubbed to promote planar alignment thereat between the preferred alignments at the first substrate. The construction is such that the alignment twists in one direction or the other on passing across the layer thickness, depending on the alignment adopted at the first substrate.

Preferably the energies of the two states of the device are substantially equal, although this depends on the energy relation between the favoured alignments at the first substrate. It is preferred that the alignment at the second substrate is substantially parallel to the direction corresponding to the energy maximum between the favoured alignments at the first substrate. Where the energies of the two favoured alignments at the first substrate are equal, this direction may be midway between the favoured alignments. Where the energies of the two favoured alignments at the first substrate are unequal, this direction may or may not be midway between the favoured alignments. However, the alignment at the second substrate can deviate from the ideal position provided that the intensity of the polarised light (and any other energy input) is sufficient for realignment.

Optionally, the liquid crystal material may include a slippery surface additive as in embodiments 1 and 2, but not at such a high concentration that the planar alignment at the second surface is rendered ineffective, and/or the device may include electrodes for applying a field across the layer thickness as in embodiment 2.

Embodiment 5

A layer of liquid crystal material containing a dichroic additive is sandwiched between first and second substrates, the first substrate having a surface profile providing an azimuthal bistable surface alignment, and the second surface comprising a surface which has been treated to promote homeotropic alignment thereat. There is twist in alignment direction on passing from one substrate to the other, regardless of the alignment direction at the first substrate, so that the energies of the two states of the device are generally or substantially equal (depending on the energy relation between the alignments at the first substrate).

Optionally, the liquid crystal material may include a slippery surface additive as in embodiments 1 and 2, but not to the extent that the alignment at the second surface is rendered ineffective, and/or the device may include electrodes for applying a field across the layer thickness as in embodiment 2.

In each of embodiments 1 to 5, it is preferred that the two favoured azimuthal alignments at the first substrate are at 90° to each other.

Embodiment 6

Figure 1:
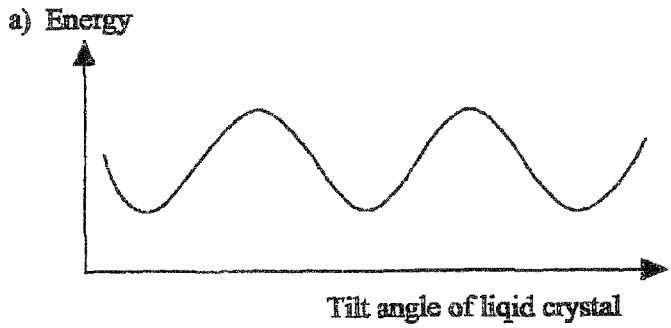
FIG. 1 schematically illustrates the variation of energy with zenithal angle of liquid crystal material on a zenithally bistable surface.
Figure 2:
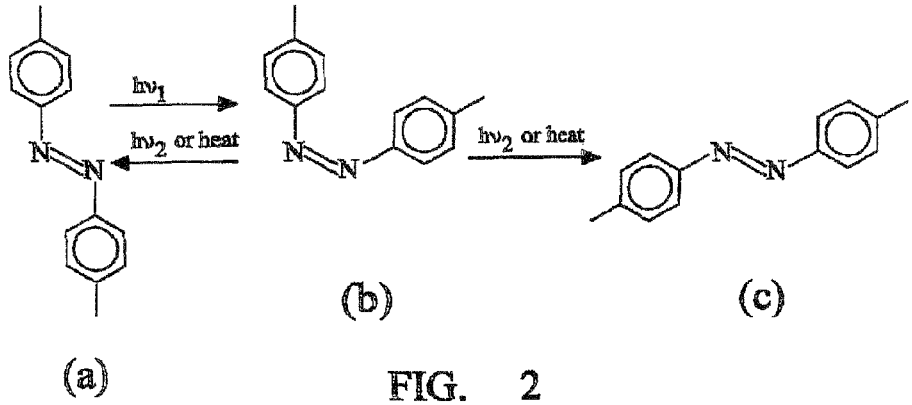
FIG. 2 schematically illustrates the effect of light on an azo compound.
Figure 8:
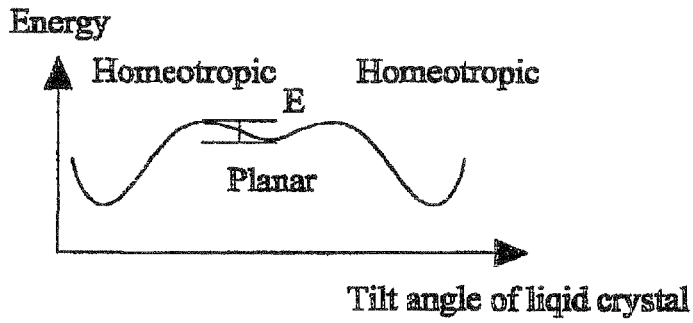
FIG. 8 schematically illustrates a zenithally "bistable" surface with a modified energy barrier relative to that of FIG. 1 so that it is effectively monostable.

While embodiments 1 to 5 incorporate azimuthally bistable substrate surfaces, this incorporates a zenithally bistable alignment layer on substrate surface 1, generally of the type already illustrated with respect to FIG. 1, and a second substrate 2 for homeotropic alignment. By tailoring the grating pitch to depth ratio, and in particular by using a relatively shallow grating, although this would depend on other parameters of the device and liquid crystal in question, it is possible to arrive at an energy profile as shown in FIG. 8, in which the planar state is stable but with only a low activation energy E for switching to the homeotropic state. Care needs to be taken that the grating pitch to depth ratio is not so low as to render the planar state totally unstable. The liquid crystal material incorporates a dichroic dye.

Figure 9:
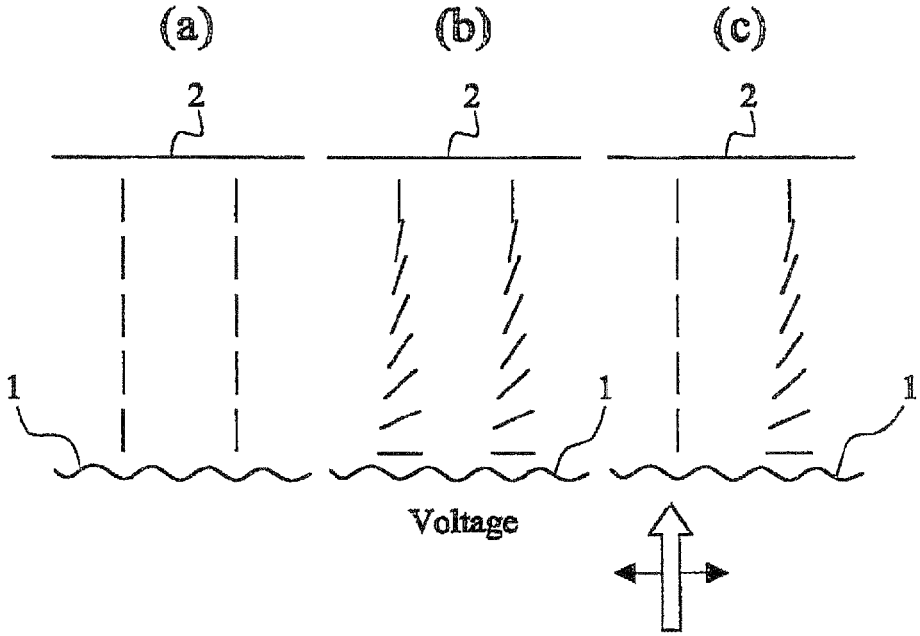
FIGS. 9(a) to 9(c) illustrate the operation of a liquid crystal cell incorporating the surface of FIG. 8.

Normally the device will rest with a homeotropic alignment as in FIG. 9(a). An electric field or voltage pulse can be used to switch the alignment at the surface of the bistable substrate 1 to planar, FIG. 9(b). This planar alignment tends to relax to the homeotropic alignment of FIG. 9(a) at a rate determined inter alia by the activation energy E, and where this is sufficiently slow, selected areas of the device may be forced to switch faster by the application of polarised light L, FIG. 9(c), arranged to apply a torque to the liquid crystal material. Thus it is possible to write a temporary image on the device, which could be repeatedly refreshed at an appropriate rate.

In the planar state the liquid crystal molecules lie perpendicular to the grooves. Light incident on the liquid crystal and linearly polarised perpendicular to the grooves will be absorbed by the dichroic dye, which will then apply a torque to the liquid crystal molecules, pushing them away from the polarisation direction. As a consequence the liquid crystal so illuminated will tend to fall into the energetically favoured homeotropic orientation.

In variations of this embodiment, the surface 2 can provide a planar orientation with a high or low pretilt, and/or it could be another grating surface. Any variation can also be operated with non-linear, e.g. circular polarised, illumination.

Embodiment 7

This is similar to embodiment 6, but the grating is deeper, thereby reversing the energy levels and making the planar state more energetically favourable. A combination of electrical and optical addressing is used to switch selected areas to the higher energy homeotropic state, the electrical field being below the threshold for switching in the absence of illumination. In this case it is the homeotropic state which is metastable and relaxes to the planar state. Forcing the transition to the planar state requires off-axis illumination. The planar state can be induced across the whole liquid crystal layer using a blanking electrical pulse.

Embodiment 8

Figure 10:
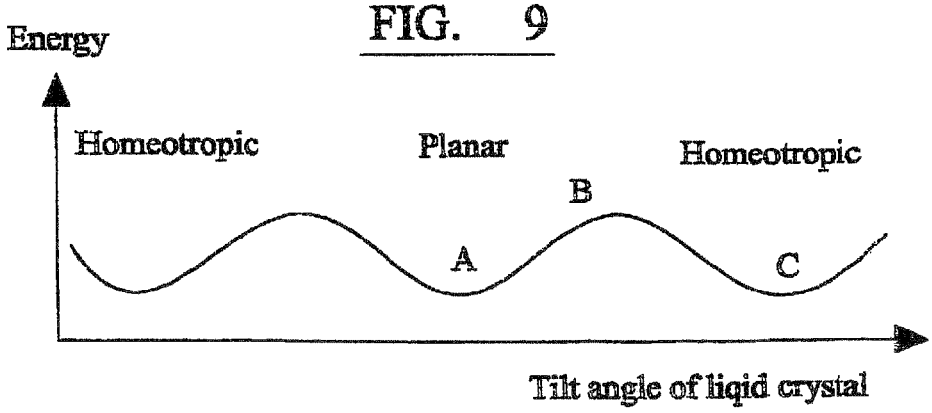
FIG. 10 is generally similar to FIG. 1, and is used to illustrate conjoint electrical and optical addressing.

Embodiments 6 and 7 represent extreme examples of zenithally bistable devices, and as previously mentioned the planar state sometimes involves a high tilt angle or defect state with line defects in the nematic director. Other grating profiles may be used which provide more distinct energy troughs for both types of alignment, as shown in FIG. 10, which is generally similar to FIG. 1. In such a case conjoint use of electrical and optical addressing is preferred, that is, the electric field may be used to switch from a (planar) state A to, say, a state B, at which point illuminated areas may pass over to (homeotropic) trough C (or the process may occur in the opposite direction C to A). Unilluminated areas will relax to state A on removal of the field and illumination.

Embodiment 9

This is a variation of Embodiment 8 in which the final nudge over the energy hump is provided by local heating rather than illumination. Such local heating can occur through light absorption by a dye or other light absorptive material, e.g. in the liquid crystal material or the grating. Non-dichroic dyes provide a polarisation insensitive device, whereas suitably aligned dichroic dyes, as in a liquid crystal host, render the heating effect dependent on the polarisation of incident illumination. The switching direction of the device is determined by the polarity of the applied electric field, and not by a light induced torque.

Figure 11:
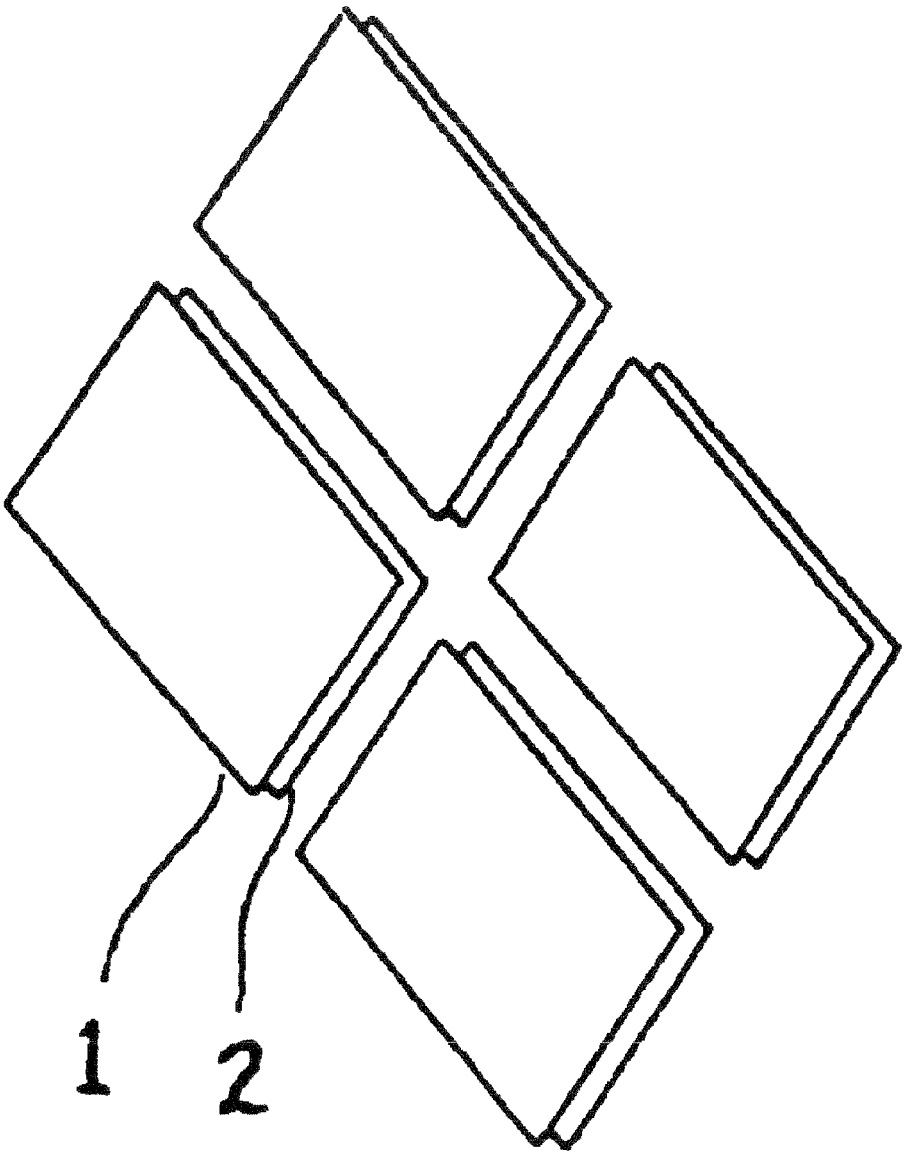
FIG. 11 illustrates an embodiment of the current invention in which a plurality of cells are employed in a common plane.

FIG. 11 shows the current invention being used to form a high resolution display. A single panel of the display comprises a liquid crystal display according to the present invention. Each panel comprises substrates 1, 2 as disclosed in relation to FIG. 3 above, between which is a LC material. The plurality of panels are arranged in a common plane. Any gap between adjacent panels is preferably kept to a minimum to minimize the appearance of such gaps to a viewer. Optical radiation may be directed towards one side such as substrate 1 of each panel, and this radiation will modify the properties of the LC as described in relation to the embodiments mentioned above. Any such modification to the properties of the LC material may be viewed as an image across all panels of the display.

What is claimed is:

1. A liquid crystal device comprising liquid crystal material in contact with the surface of a substrate, said surface [favouring] *favoring* at least first and second stable or metastable liquid crystal alignments thereat with respective first and second different directions, and switching means for causing the liquid crystal material to switch between said alignments, wherein said switching means includes first energy supplying means arranged for applying optical radiation to said liquid crystal material, characterized in that said liquid crystal material and said optical radiation are selected for significant absorption of the radiation by the liquid crystal material.

2. A device according to claim 1 wherein said first energy supplying means is arranged to provide linearly polarised light of a polarisation direction and spectral composition selected or selectable for effectively rendering one of the first and second alignments less energetically [favourable] *favorable* than the other of said [the fire] *first* and second alignments.

3. A device according to claim 1 wherein said first energy supplying means is arranged to provide linearly polarised light of a polarisation direction and spectral composition selected or selectable for effectively inducing a torque on *molecules of* the liquid crystal [molecules] *material* to alter the liquid crystal alignment between the first and second alignments.

4. A device according to claim 2 wherein the liquid crystal material contains no dichroic additive, and said spectral composition includes an absorption band of the liquid crystal material.

5. A device according to claim 1 wherein the liquid crystal material comprises a dichroic additive in a liquid crystal host.

6. A device according to claim 5 wherein [the said] *a* spectral composition *associated with the optical radiation* includes an absorption band of the dichroic additive.

7. A device according to claim 5 wherein [the said] *a* spectral composition *associated with the optical radiation* includes an absorption band of the liquid crystal host.

8. A device according to claim 2 wherein said switching means further comprises second energy supplying means to assist in the switching of the liquid crystal material between said alignments.

9. A device according to claim 8 wherein the second energy supplying means is arranged to apply energy to the liquid crystal material to destabilise the existing liquid crystal alignment.

10. A device according to claim 8 wherein the energy from said second energy supplying means induces a homeotropic alignment at the surface of the substrate.

11. A device according to claim 8 wherein the energy from said second energy supplying means induces a planar alignment at the surface of the substrate.

12. A device according to claim 8 wherein the said second energy is provided by an electric field.

13. A device according to claim 8 wherein said second energy supplying means is arranged to promote said switching of the liquid crystal material between said alignments, but is insufficient of itself to cause said switching.

14. A device according to claim 1 and further comprising second energy supplying means to assist in the switching of the liquid crystal material between said alignments.

15. A device according to claim 14 wherein said second energy supplying means is arranged to determine which of said alignments is adopted.

16. A device according to claim 15 wherein said first energy supplying means cooperates with the device to produce heat by light absorption, to cause said switching in cooperation with said second energy supplying means.

17. A device according to claim 15 wherein the energy from said second energy supplying means [favours] *favors* a homeotropic alignment of the [LC] *liquid crystal* material at the substrate.

18. A device according to claim 15 wherein the energy from said second energy supplying means induces a planar alignment of the [LC] *liquid crystal* material at the substrate.

19. A device according to claim 14 wherein the said second energy is provided by an electric field.

20. A device according to claim 1 wherein the liquid crystal material comprises an oligomer for reducing the energy between the first and second alignments.

21. A device according to claim 1 wherein the first energy supplying means is arranged for local irradiation of the device.

22. A device according to claim 1 wherein the first alignment is planar.

23. A device according to claim 1 wherein the second alignment is planar.

24. A device according to claim 1 wherein the second alignment is homeotropic.

25. A device according to claim 1 wherein the [alignment is comprised of] *surface comprises* a grating structure.

26. A display comprising a device according to claim 1.

27. An optical system or display comprising a plurality of optical devices, at least one said device being a device according to claim 1.

28. An optical system comprising a plurality of said devices each according to claim 1.

29. A system according to claim 27 wherein said plurality *of optical devices* is tiled in a common plane.

30. A method [of controlling the alignment of liquid crystal material in contact with a substrate surface which favours at least first and second stable or metastable liquid crystal alignments thereat with respective first and second different directions, including the step of], *comprising of:* optically irradiating [said] *a liquid crystal* material with radiation, *wherein* a significant portion of said radiation *is* absorbed by said liquid crystal material*; and*

*controlling, based at least in part on said optically irradiating, an alignment of said liquid crystal material in contact with a substrate surface which favors both a first stable or metastable alignment associated with a first direction and a second stable or metastable alignment associated with a second direction, wherein the second direction is different than the first direction.*

31. The method according to claim 30 wherein the step of optically irradiating provides radiation selected for significant absorption by the liquid crystal material.

32. The method according to claim 30 wherein said step of optically irradiating includes the provision of linearly polarised light.

33. The method according to claim 32 wherein said linearly polarised light is [such as to effectively] *configured to* exert a torque on *molecules of* the liquid crystal [molecules] *material* or to effectively rotate the [liquid crystal] molecules.

34. The method according to claim [33] *30* wherein said step of optically irradiating includes the provision of unpolarised light.

35. The method according to claim 34 wherein the unpolarised light produces heating in the liquid crystal material.

36. The method according to claim 30 including [the additional step of] providing a further energy input [to the device] for controlling the alignment.

37. The method according to claim 36 wherein the further energy input is an electric field.

38. The method according to claim 36 wherein the optical irradiation continues after the further energy input has ceased.

39. The method according to claim 36 wherein the further energy input continues after the optical irradiation has ceased.

40. The method according to claim 36 wherein the further energy input is applied locally.

41. The method according to claim 30 wherein the optical irradiation is applied locally.

42. The method according to claim 30 wherein one [said alignment] *of the liquid crystal alignments* is planar.

43. The method according to claim 42 wherein another [said alignment] *of the liquid crystal alignments* is planar.

44. The method according to claim 42 wherein another [said alignment] *of the liquid crystal alignments* is homeotropic.

45. The method according to claim 30 including the step of providing an oligomer in [the] *a* liquid crystal phase of the material.

46. The method according to claim 30 wherein said substrate surface is provided as a grating structure.

*47. A device, comprising:*

*a substrate configured to promote a phase alignment in a first direction and a second direction; and*

*a liquid crystal material located adjacent the substrate, wherein different portions of the liquid crystal material are configured to be coincidentally aligned with the first and second directions of alignment when localized areas of the device are optically addressed based, at least in part, on a significant absorption of optical radiation by the liquid crystal material.*

*48. The device of claim 47, wherein the first direction of alignment is a favored alignment of the substrate, and wherein metastable portions of the liquid crystal material that correspond to the localized areas of the device are configured to be aligned with the favored alignment when the device is optically addressed.*

*49. The device of claim 48, wherein the favored alignment is more stable than a state of the metastable portions.*

*50. The device of claim 47, wherein the localized areas of the device are both optically addressed and electrically addressed.*

*51. The device of claim 47, wherein an electric field is configured to be applied universally to the device while the localized areas of the device are optically addressed.*

*52. The device of claim 47, wherein energy states associated with the first and second directions of alignment are equal.*

*53. The device of claim 52, further comprising another substrate, wherein the liquid crystal material is located between the two substrates, and wherein a direction of alignment of the liquid crystal material at the other substrate is midway between the first and second directions of alignment.*

*54. The device of claim 47, wherein the different portions of the liquid crystal material are configured to switch between the first and second directions of alignment whereas other portions of the liquid crystal material do not switch.*

*55. The device of claim 54, wherein the other portions of the liquid crystal material are not optically addressed.*

*56. The device of claim 54, wherein at least some of the different portions are aligned in the first direction and at least some of the other portions are aligned in the second direction.*

*57. A method, comprising:*

*optically addressing a liquid crystal material located adjacent a substrate, wherein the substrate is configured to promote a phase alignment in both a first direction of alignment and a second direction of alignment; and*

*switching different portions of the liquid crystal material coincidentally between the first direction of alignment and the second direction of alignment based, at least in part, on a significant absorption of optical radiation by the liquid crystal material.*

*58. The method of claim 57, wherein the different portions of the liquid crystal material are configured to switch according to a localized absorption of the optical radiation in the liquid crystal material.*

*59. The method of claim 57, wherein the different portions of the liquid crystal material are selectively addressed by the optical radiation.*

*60. The method of claim 59, wherein certain portions of the liquid crystal material are not optically addressed.*

*61. The method of claim 60, wherein a first portion of the liquid crystal material is aligned differently than a second portion of the liquid crystal material after the liquid crystal material is optically addressed.*

*62. The method of claim 57, further comprising supplying a secondary source of energy to the liquid crystal material to assist said switching.*

*63. The method of claim 62, wherein the secondary source of energy is provided by an electric field.*

* * * * *